(12) United States Patent
Joseph et al.

(10) Patent No.: US 9,004,091 B2
(45) Date of Patent: Apr. 14, 2015

(54) SHAPE-MEMORY APPARATUSES FOR RESTRICTING FLUID FLOW THROUGH A CONDUIT AND METHODS OF USING SAME

(75) Inventors: Basil J. Joseph, Sugar Land, TX (US); Clint Mickey, Spring, TX (US); Andre J. Porter, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 607 days.

(21) Appl. No.: 13/314,743

(22) Filed: Dec. 8, 2011

(65) Prior Publication Data

US 2013/0146144 A1 Jun. 13, 2013

(51) Int. Cl.
| | |
|---|---|
| *F16K 17/40* | (2006.01) |
| *E21B 23/04* | (2006.01) |
| *F16K 15/04* | (2006.01) |
| *F16K 25/00* | (2006.01) |
| *F16K 27/02* | (2006.01) |

(52) U.S. Cl.
CPC ............... *F16K 15/048* (2013.01); *E21B 23/04* (2013.01); *F16K 25/005* (2013.01); *F16K 27/0209* (2013.01)

(58) Field of Classification Search
USPC ......... 137/67, 533.11, 533.15, 356, 359, 368; 166/239, 386, 326
See application file for complete search history.

(56) References Cited

U.S. PATENT DOCUMENTS

| | | | |
|---|---|---|---|
| 1,883,071 A | 10/1932 | Stone | |
| 2,117,539 A | 5/1938 | Baker et al. | |
| 2,769,454 A | 11/1956 | Bletcher et al. | |
| 2,799,349 A * | 7/1957 | Clark, Jr. | 166/320 |
| 2,822,757 A | 2/1958 | Coberly | |
| 2,829,719 A | 4/1958 | Clark, Jr. | |
| 2,857,972 A | 10/1958 | Baker et al. | |
| 2,973,006 A | 2/1961 | Nelson | |
| 3,007,527 A | 11/1961 | Nelson | |
| 3,013,612 A | 12/1961 | Angel | |
| 3,043,903 A | 7/1962 | Keane et al. | |
| 3,090,442 A | 5/1963 | Cochran et al. | |

(Continued)

FOREIGN PATENT DOCUMENTS

| | | |
|---|---|---|
| CA | 2460712 | 4/2005 |
| EP | 0518371 A3 | 12/1992 |

(Continued)

OTHER PUBLICATIONS

D.W. Thomson, et al., Design and Installation of a Cost-Effective Completion System for Horizontal Chalk Wells Where Multiple Zones Require Acid Stimulation, SPE Drilling & Completion, Sep. 1998, pp. 151-156, Offshore Technology Conference, U.S.A.

(Continued)

*Primary Examiner* — John K Fristoe, Jr.
*Assistant Examiner* — Minh Le
(74) *Attorney, Agent, or Firm* — Shawn Hunter

(57) ABSTRACT

Apparatuses for restricting fluid flow through a well conduit comprise a tubular member having a seat member disposed within the tubular member for receiving a plug element. One or both of the seat member or the plug element comprise at least one shape-memory material to facilitate the plug element being able to land on the seat and/or to facilitate the plug element to pass through a seat member or other restriction in the tubular member either before or after landing on a seat.

10 Claims, 6 Drawing Sheets

(56) References Cited

U.S. PATENT DOCUMENTS

| | | | |
|---|---|---|---|
| 3,159,219 A * | 12/1964 | Scott | 166/156 |
| 3,211,232 A | 10/1965 | Grimmer | |
| 3,220,481 A | 11/1965 | Park | |
| 3,220,491 A | 11/1965 | Mohr | |
| 3,510,103 A | 5/1970 | Carsello | |
| 3,566,964 A | 3/1971 | Livingston | |
| 3,667,505 A | 6/1972 | Radig | |
| 3,727,635 A | 4/1973 | Todd | |
| 3,776,258 A | 12/1973 | Dockins, Jr. | |
| 3,901,315 A | 8/1975 | Parker et al. | |
| 4,114,694 A | 9/1978 | Dinning | |
| 4,160,478 A | 7/1979 | Calhoun et al. | |
| 4,194,566 A | 3/1980 | Maly | |
| 4,291,722 A | 9/1981 | Churchman | |
| 4,292,988 A | 10/1981 | Montgomery | |
| 4,314,608 A | 2/1982 | Richardson | |
| 4,374,543 A | 2/1983 | Richardson | |
| 4,390,065 A | 6/1983 | Richardson | |
| 4,448,216 A | 5/1984 | Speegle et al. | |
| 4,478,279 A | 10/1984 | Puntar et al. | |
| 4,510,994 A | 4/1985 | Pringle | |
| 4,520,870 A | 6/1985 | Pringle | |
| 4,537,255 A | 8/1985 | Regalbuto et al. | |
| 4,537,383 A | 8/1985 | Fredd | |
| 4,576,234 A | 3/1986 | Upchurch | |
| 4,583,593 A | 4/1986 | Zunkel et al. | |
| 4,669,538 A | 6/1987 | Szarka | |
| 4,729,432 A | 3/1988 | Helms | |
| 4,823,882 A | 4/1989 | Stokley et al. | |
| 4,826,135 A | 5/1989 | Mielke | |
| 4,828,037 A | 5/1989 | Lindsey et al. | |
| 4,848,691 A | 7/1989 | Muto et al. | |
| 4,862,966 A | 9/1989 | Lindsey et al. | |
| 4,893,678 A | 1/1990 | Stokley et al. | |
| 4,915,172 A | 4/1990 | Donovan et al. | |
| 4,949,788 A | 8/1990 | Szarka et al. | |
| 4,991,654 A | 2/1991 | Brandell et al. | |
| 5,056,599 A | 10/1991 | Comeaux et al. | |
| 5,146,992 A | 9/1992 | Baugh | |
| 5,244,044 A | 9/1993 | Henderson | |
| 5,246,203 A | 9/1993 | McKnight et al. | |
| 5,297,580 A | 3/1994 | Thurman | |
| 5,309,995 A | 5/1994 | Gonzalez et al. | |
| 5,333,689 A | 8/1994 | Jones et al. | |
| 5,335,727 A | 8/1994 | Cornette et al. | |
| 5,413,180 A | 5/1995 | Ross et al. | |
| 5,479,986 A | 1/1996 | Gano et al. | |
| 5,501,276 A | 3/1996 | Weaver et al. | |
| 5,558,153 A | 9/1996 | Holcombe et al. | |
| 5,577,560 A | 11/1996 | Coronado et al. | |
| 5,607,017 A | 3/1997 | Owens et al. | |
| 5,623,993 A | 4/1997 | Van Buskirk et al. | |
| 5,685,372 A | 11/1997 | Gano | |
| 5,704,393 A | 1/1998 | Connell et al. | |
| 5,709,269 A | 1/1998 | Head | |
| 5,762,142 A | 6/1998 | Connell et al. | |
| 5,765,641 A | 6/1998 | Shy et al. | |
| 5,813,483 A | 9/1998 | Latham et al. | |
| 5,960,881 A | 10/1999 | Allamon et al. | |
| 5,992,289 A | 11/1999 | George et al. | |
| 6,003,607 A | 12/1999 | Hagen et al. | |
| 6,026,903 A | 2/2000 | Shy et al. | |
| 6,050,340 A | 4/2000 | Scott | |
| 6,053,248 A | 4/2000 | Ross | |
| 6,053,250 A | 4/2000 | Echols | |
| 6,062,310 A | 5/2000 | Wesson et al. | |
| 6,076,600 A | 6/2000 | Vick, Jr. et al. | |
| 6,079,496 A | 6/2000 | Hirth | |
| 6,102,060 A | 8/2000 | Howlett et al. | |
| 6,155,350 A | 12/2000 | Melenyzer | |
| 6,161,622 A | 12/2000 | Robb et al. | |
| 6,186,691 B1 * | 2/2001 | Rudolf-Bauer | 403/31 |
| 6,189,618 B1 | 2/2001 | Beeman et al. | |
| 6,220,350 B1 | 4/2001 | Brothers et al. | |
| 6,279,656 B1 | 8/2001 | Sinclair et al. | |
| 6,289,991 B1 | 9/2001 | French | |
| 6,293,517 B1 | 9/2001 | Cunningham | |
| 6,382,234 B1 | 5/2002 | Birkhead et al. | |
| 6,397,950 B1 | 6/2002 | Streich et al. | |
| 6,431,276 B1 | 8/2002 | Robb et al. | |
| 6,457,517 B1 | 10/2002 | Goodson et al. | |
| 6,467,546 B2 | 10/2002 | Allamon et al. | |
| 6,530,574 B1 | 3/2003 | Bailey et al. | |
| 6,547,007 B2 | 4/2003 | Szarka et al. | |
| 6,634,428 B2 | 10/2003 | Krauss et al. | |
| 6,666,273 B2 | 12/2003 | Laurel | |
| 6,668,933 B2 | 12/2003 | Kent | |
| 6,708,946 B1 | 3/2004 | Edwards et al. | |
| 6,779,600 B2 | 8/2004 | King et al. | |
| 6,834,726 B2 | 12/2004 | Giroux et al. | |
| 6,848,511 B1 | 2/2005 | Jones et al. | |
| 6,866,100 B2 | 3/2005 | Gudmestad et al. | |
| 6,896,049 B2 | 5/2005 | Moyes | |
| 6,926,086 B2 | 8/2005 | Patterson et al. | |
| 6,966,368 B2 | 11/2005 | Farquhar | |
| 7,021,389 B2 | 4/2006 | Bishop et al. | |
| 7,093,664 B2 | 8/2006 | Todd et al. | |
| 7,150,326 B2 | 12/2006 | Bishop et al. | |
| 7,151,157 B2 * | 12/2006 | Mather | 528/480 |
| 7,311,118 B2 | 12/2007 | Doutt | |
| 7,325,617 B2 | 2/2008 | Murray | |
| 7,350,582 B2 | 4/2008 | McKeachnie et al. | |
| 7,353,879 B2 | 4/2008 | Todd et al. | |
| 7,395,856 B2 | 7/2008 | Murray | |
| 7,416,029 B2 | 8/2008 | Telfer et al. | |
| 7,464,764 B2 | 12/2008 | Xu | |
| 7,469,744 B2 | 12/2008 | Ruddock et al. | |
| 7,503,392 B2 | 3/2009 | King et al. | |
| 7,625,846 B2 | 12/2009 | Cooke, Jr. | |
| 7,628,210 B2 | 12/2009 | Avant et al. | |
| 7,640,991 B2 | 1/2010 | Leising | |
| 7,644,772 B2 | 1/2010 | Avant et al. | |
| 8,056,618 B2 * | 11/2011 | Wagner et al. | 166/57 |
| 2001/0045288 A1 * | 11/2001 | Allamon et al. | 166/373 |
| 2002/0162661 A1 | 11/2002 | Krauss et al. | |
| 2003/0037921 A1 | 2/2003 | Goodson | |
| 2003/0141064 A1 | 7/2003 | Roberson, Jr. | |
| 2003/0168214 A1 | 9/2003 | Sollesnes | |
| 2004/0108109 A1 | 6/2004 | Allamon et al. | |
| 2005/0061372 A1 | 3/2005 | McGrath et al. | |
| 2005/0092363 A1 | 5/2005 | Richard et al. | |
| 2005/0092484 A1 | 5/2005 | Evans | |
| 2005/0126638 A1 | 6/2005 | Gilbert | |
| 2005/0161224 A1 | 7/2005 | Starr et al. | |
| 2005/0197488 A1 * | 9/2005 | Mather | 528/480 |
| 2005/0205264 A1 | 9/2005 | Starr et al. | |
| 2005/0205265 A1 | 9/2005 | Todd et al. | |
| 2005/0205266 A1 | 9/2005 | Todd et al. | |
| 2005/0281968 A1 | 12/2005 | Shanholtz et al. | |
| 2006/0021748 A1 | 2/2006 | Swor et al. | |
| 2006/0131031 A1 | 6/2006 | McKeachnie et al. | |
| 2006/0175092 A1 | 8/2006 | Mashburn | |
| 2006/0213670 A1 | 9/2006 | Bishop et al. | |
| 2006/0243455 A1 | 11/2006 | Telfer et al. | |
| 2006/0266518 A1 | 11/2006 | Woloson | |
| 2007/0023087 A1 | 2/2007 | Krebs et al. | |
| 2007/0029080 A1 | 2/2007 | Moyes | |
| 2007/0062706 A1 | 3/2007 | Leising | |
| 2007/0074873 A1 | 4/2007 | McKeachnie et al. | |
| 2007/0169935 A1 | 7/2007 | Akbar et al. | |
| 2007/0295507 A1 | 12/2007 | Telfer | |
| 2008/0017375 A1 | 1/2008 | Wardley | |
| 2008/0066923 A1 | 3/2008 | Xu | |
| 2008/0066924 A1 | 3/2008 | Xu | |
| 2008/0217025 A1 | 9/2008 | Ruddock et al. | |
| 2009/0025927 A1 | 1/2009 | Telfer | |
| 2009/0044946 A1 | 2/2009 | Schasteen et al. | |
| 2009/0044948 A1 | 2/2009 | Avant et al. | |
| 2009/0044949 A1 | 2/2009 | King et al. | |
| 2009/0044955 A1 | 2/2009 | King et al. | |
| 2009/0107684 A1 | 4/2009 | Cooke, Jr. | |
| 2009/0187241 A1 * | 7/2009 | Melsheimer | 623/2.36 |
| 2010/0032151 A1 | 2/2010 | Duphorne | |
| 2010/0132954 A1 | 6/2010 | Telfer | |

(56) References Cited

U.S. PATENT DOCUMENTS

| | | | |
|---|---|---|---|
| 2011/0021097 A1* | 1/2011 | Mather et al. | 442/60 |
| 2011/0030954 A1* | 2/2011 | Allison et al. | 166/285 |
| 2011/0187062 A1 | 8/2011 | Xu | |
| 2011/0315373 A1* | 12/2011 | O'Connell | 166/179 |
| 2011/0315390 A1 | 12/2011 | Guillory et al. | |
| 2012/0012771 A1 | 1/2012 | Korkmaz et al. | |
| 2012/0048556 A1 | 3/2012 | O'Connell et al. | |
| 2012/0199341 A1 | 8/2012 | Kellner et al. | |
| 2012/0227980 A1 | 9/2012 | Fay | |
| 2012/0261115 A1 | 10/2012 | Xu | |
| 2012/0261140 A1 | 10/2012 | Xu | |
| 2012/0305236 A1 | 12/2012 | Gouthaman | |
| 2012/0312557 A1 | 12/2012 | King | |

FOREIGN PATENT DOCUMENTS

| | | | |
|---|---|---|---|
| WO | WO/02 068793 A1 | 9/2002 | |
| WO | WO 03006787 A1 | 1/2003 | |

OTHER PUBLICATIONS

H.A. Nasr-El-Din, et al., Laboratory Evaluation Biosealers, Feb. 13, 2001, pp. 1-11, SPE 65017, Society of Petroleum Engineers Inc., U.S.A.

Baker Hughes Incorporated. Model "E" Hydro-Trip Pressure Sub, Product Family No. H79928, Sep. 25, 2003, pp. 1-4, Baker Hughes Incorporated, Houston, Texas USA.

Innicor Completion Systems, HydroTrip Plug Sub, Product No. 658 0000, Jul. 26, 2004, p. 1, Innicor Completion Systems, Canada.

K.L. Smith, et al., "Ultra-Deepwater Production Systems Technical Progress Report," U.S. Department of Energy, Science and Technical Information, Annual Technical Progress Report, Jan. 2005, pp. 1-32, ConocoPhillips Company, U.S.A.

X. Li, et al., An Integrated Transport Model for BallSealer Diversion in Vertical and Horizontal Wells, Oct. 9, 2005, pp. 1-9, SPE 96339, Society of Petroleum Engineers, U.S.A.

G.L. Rytlewski, A Study of Fracture Initiation Pressures in Cemented Cased Hole Wells Without Perforations, May 15, 2006, pp. 1-10, SPE 100572, Society of Petroleum Engineers, U.S.A.

StageFRAC Maximize Reservoir Drainage, 2007, pp. 1-2, Schlumberger, U.S.A.

Brad Musgrove, Multi-Layer Fracturing Solution Treat and Produce Completions, Nov. 12, 2007, pp. 1-23, Schlumberger, U.S.A.

Andreas Lendlein, et al., "Shape-Memory Polymers," Angew. Chem. Int. Ed., 2002, 2034-2057, 41, WILEY-VCH Verlag GmbH, Weinheim, Germany.

\* cited by examiner

SHAPE-MEMORY APPARATUSES FOR RESTRICTING FLUID FLOW THROUGH A CONDUIT AND METHODS OF USING SAME

BACKGROUND

1. Field of Invention

The present invention is directed to apparatuses for restricting fluid flow through a conduit or tubular member within oil and gas wells and, in particular, to apparatuses having one or both of a shape-memory seat or plug element that facilitate either passing the plug element through a seat or restriction disposed in the tubular member, or facilitate landing the plug element on the seat.

2. Description of Art

Ball seats are generally known in the art. For example, typical ball seats have a bore or passageway that is restricted by a seat. The ball or plug element is disposed on the seat, preventing or restricting fluid from flowing through the bore of the ball seat and, thus, isolating the tubing or conduit section in which the ball seat is disposed. As force is applied to the ball or plug element, the conduit can be pressurized for tubing testing or tool actuation or manipulation, such as in setting a packer. Ball seats are used in cased hole completions, liner hangers, flow diverters, frac systems, and flow control equipment and other systems.

Although the terms "ball seat" and "ball" are used herein, it is to be understood that a drop plug or other shaped plugging device or element may be used with the "ball seats" disclosed and discussed herein. For simplicity it is to be understood that the terms "ball" and "plug element" include and encompass all shapes and sizes of plugs, balls, darts, or drop plugs unless the specific shape or design of the "ball" is expressly discussed.

SUMMARY OF INVENTION

Broadly, the apparatuses disclosed herein comprise a housing, a seat, and a plug element wherein one or both of the seat or the plug element comprises at least one shape-memory material. Depending on the embodiment, the seat and/or plug element comprise a first shape and a second shape. Either the first shape or the second shape is the operational shape of the seat and/or plug element and the corresponding other shape is the non-operational shape of the seat and/or plug element. Either the operational shape or the non-operational shape is the "memorized" shape, i.e., the shape toward which the seat and/or plug element is biased due to the shape-memory material out of which the seat and/or plug element is formed. The term "operational shape" is defined herein to mean the shape in which the plug element can be landed on the seat to restrict fluid flow through the conduit or tubular member in which the seat is disposed.

In one specific embodiment, the plug element is formed of one or more shape-memory materials that provides a plug element that is soft or malleable/pliable such that the plug element can be pushed through one or more restrictions within the tubular member. Thus, in this particular embodiment, the plug element comprises an amorphous non-operational shape that can be changed by an outside stimulus, such as due to pressure acting on the plug element. After passing through one or more restrictions, the plug element can be triggered by another stimulus to change shape to its operational shape, such as into a hardened spherical shape or other desired or necessary shape to engage a seat to restrict fluid flow through the seat.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

Figure 1:
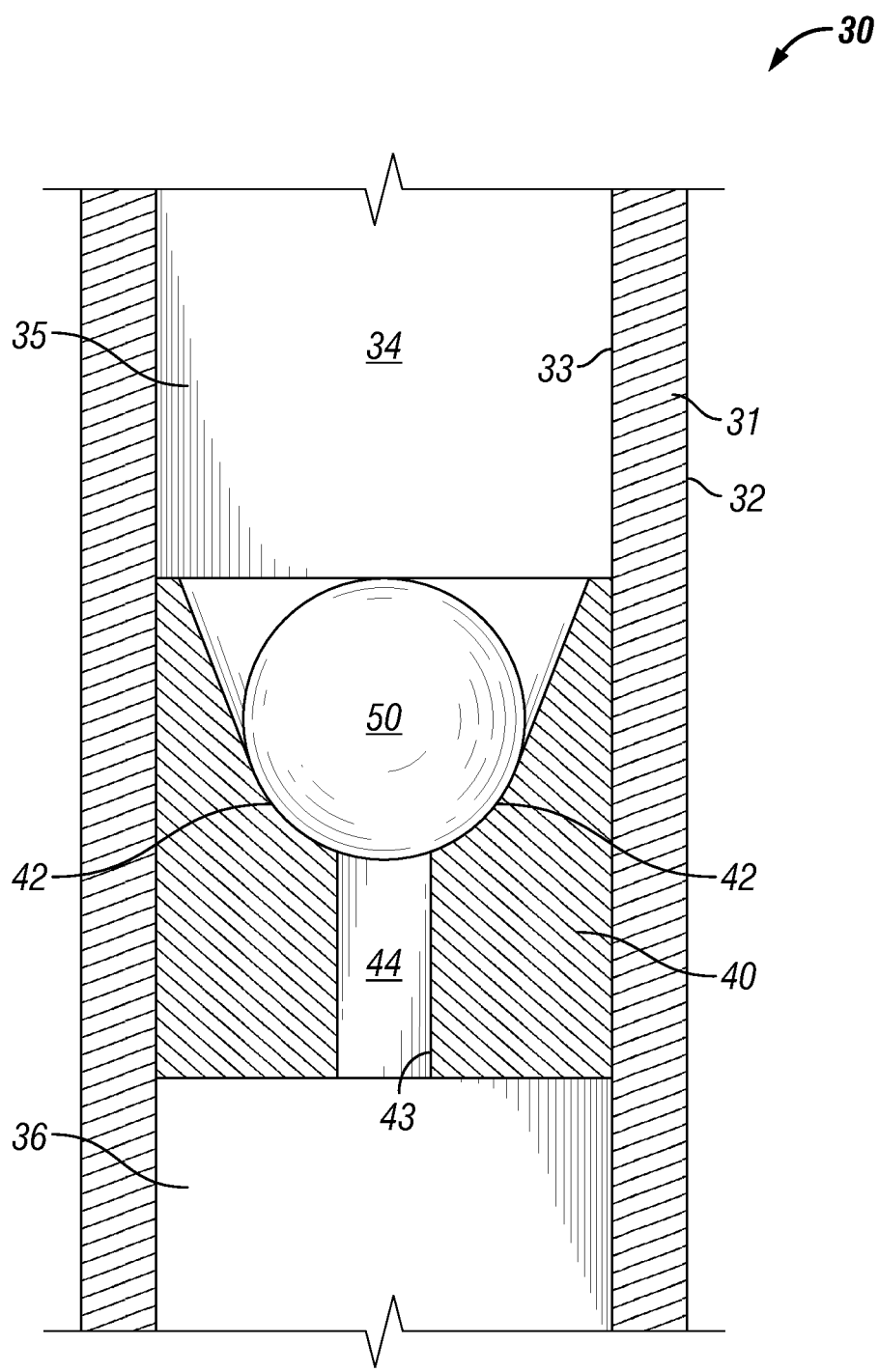
FIG. 1 is a partial cross-sectional view of a specific embodiment of an apparatus for restricting fluid flow through a conduit showing a seat in its first position with a plug element landed on the seat.
Figure 2:
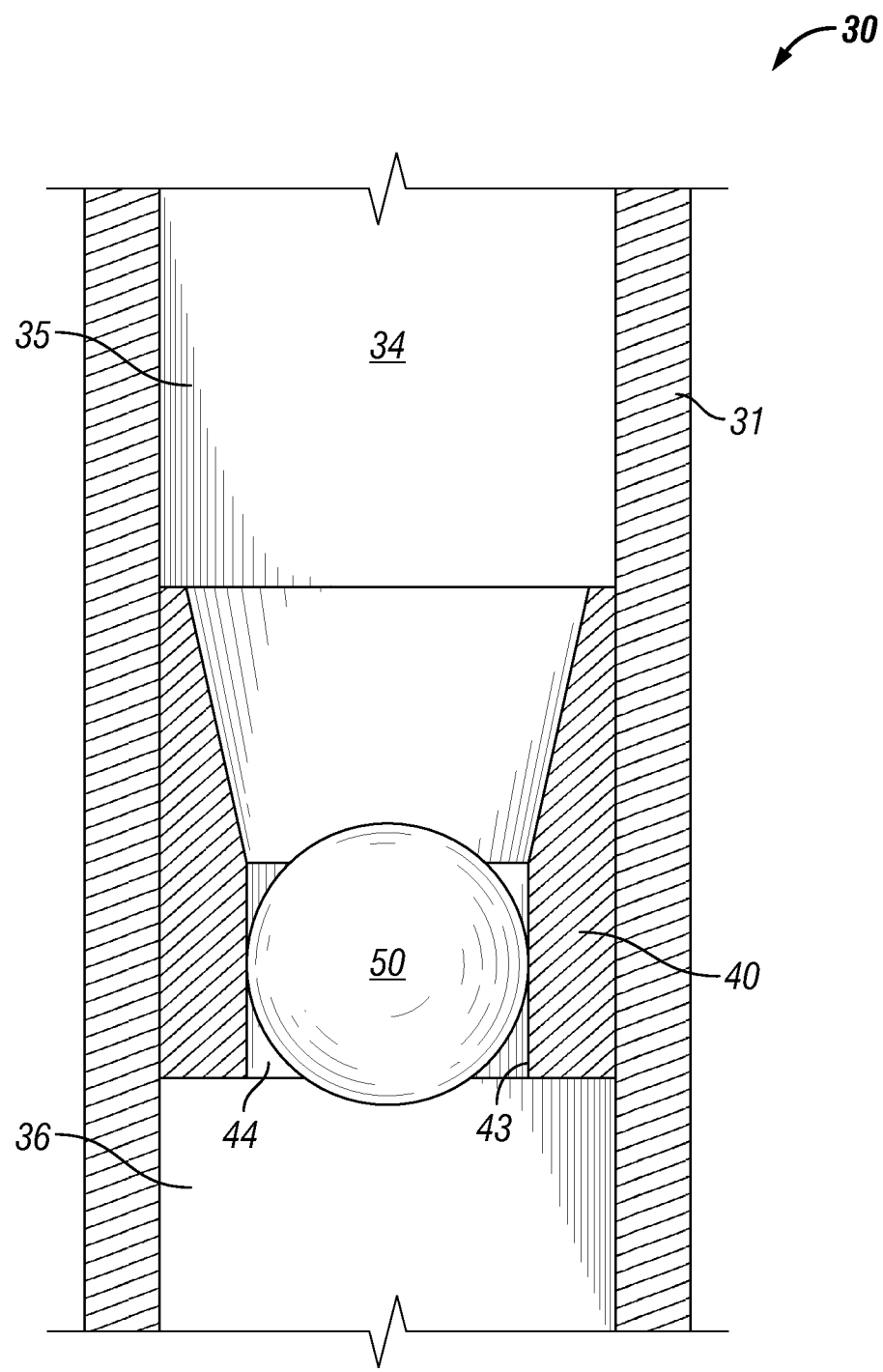
FIG. 2 is a partial cross-sectional view of the apparatus of FIG. 1 showing the seat in its second position with the plug element moving through the seat.
Figure 3:
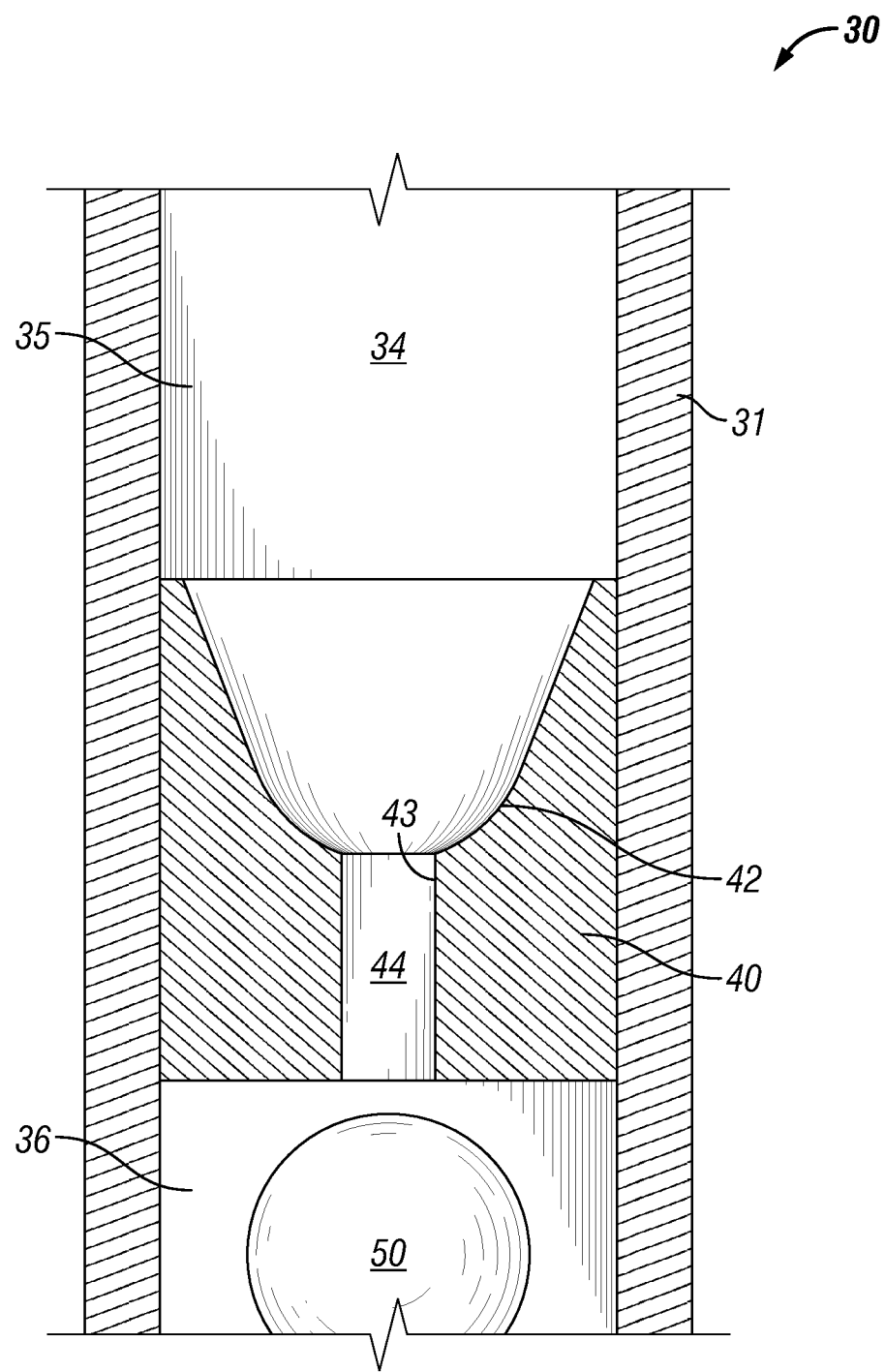
FIG. 3 is a partial cross-sectional view of the apparatus of FIG. 1 showing the seat returned to its first position after the plug element has moved through the seat.

Referring now to FIGS. 1-3, in one particular embodiment, an apparatus for restricting fluid flow is shown as ball seat 30 comprising tubular member 31 and seat member 40. Tubular member 31 comprises outer wall surface 32 and inner wall surface 33 defining bore 34. Bore 34 is divided into upper bore 35 and lower bore 36 by seat member 40. Seat member 40 can be secured to inner wall surface 33 through any method or device know in the art. In one particular embodiment, seat member 40 is secured to inner wall surface 33 by threads (not shown) on inner wall surface 33 and an outer wall surface of seat member 40. In another embodiment, seat member 40 is secured to inner wall surface 33 by bolts or other fasteners. In still another embodiment, seat member 40 is machined into inner wall surface 33 of tubular member such that tubular member 31 and seat member 40 are one piece, i.e., integral.

Seat member 40 comprises seat 42 and inner wall surface 43 defining seat member bore 44. In the embodiment of FIGS. 1-3, seat 42 is curved so as to be reciprocal in shape to a plug member shown as a spherical ball 50. Seat 42 provides a sealing surface for engagement with ball 50. The term "sealing surface" is defined herein to mean the contact area between seat 42 and ball 50.

In the embodiment of FIGS. 1-3, seat member 40 is formed out of one or more shape-memory materials. Suitable shape-memory materials include shape-memory polymers and shape-memory alloys. Shape-memory polymers and shape-memory alloys are materials that "remember" their original shapes. Shape-memory polymers and shape-memory alloys can change shape, stiffness, position, natural frequency, and other mechanical characteristics in response to a stimulus such as temperature, electromagnetic fields, chemical solutions, light, and the like. Examples of shape-memory polymers include, but are not limited to, polyurethanes, polyurethanes with ionic or mesogenic components, block copolymers consisting of polyethyleneterephthalate and polyethyleneoxide, block copolymers containing polystyrene and polybutadiene, polyesterurethanes with methylenebis and butanediol, and epoxy resins. Examples of shape-memory alloys include, but are not limited to, nickel-titanium alloys also referred to as Nitinol, copper-aluminum-nickel alloys, copper-zinc-aluminum alloys, and iron-manganese-silicon alloys.

In operation of the embodiment of FIGS. 1-3, ball seat 30 is secured to a work or tubing string (not shown) and lowered into the wellbore (not shown). A downhole tool (not shown) is disposed in the work string above ball seat 30. Upon reaching the desired location within the wellbore, plug element, shown in this embodiment as ball 50, is transported down the tubing string until it lands on seat 42 of seat member 40. Thereafter, fluid, such as hydraulic fluid, is pumped down the tubing string causing downward force or pressure to act on ball 50 to force ball 50 into seat 42. The fluid pressure above ball 50 is increased until it reaches the actuation pressure of the downhole tool causing the downhole tool to perform its intended function, e.g., open a valve, set a packer, set a bridge plug, and the like.

After the downhole tool has performed its intended function, additional fluid pressure or other stimulus, such as heat, acidity, electromagnetic pulse(s), light, etc., can be exerted on ball 50 to force ball 50 further into and, ultimately, through seat member 40 as illustrated in FIGS. 2-3. During passage of ball 50 through seat member 40, seat member 40 is deformed such that the diameter of seat member bore 44 is enlarged to permit passage of ball 50 through the bore 44 as illustrated in FIG. 2. After passage of ball 50 through seat member 40, seat member 40 is caused by the shape-memory material to return to its original shape (as shown in FIG. 3) so that another plug element can be transported through the tubing string and landed on seat 42. Accordingly, ball seat 30 is reusable for actuation of another downhole tool or for performance of any other suitable downhole operation, e.g., acid stimulation.

Figure 4:
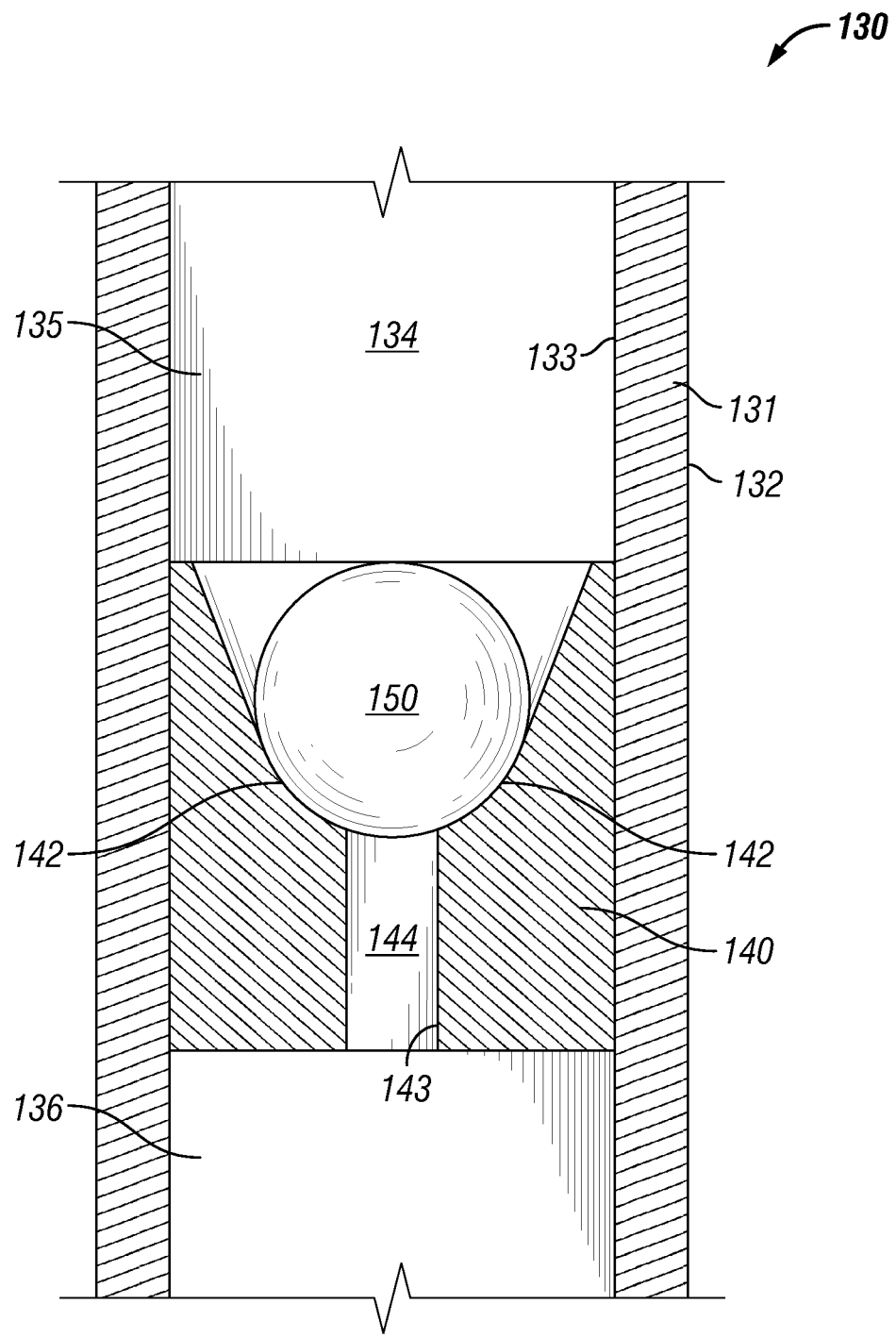
FIG. 4 is a partial cross-sectional view of another specific embodiment of an apparatus for restricting fluid flow through a conduit showing a seat in its first position with a plug element in its first position landed on the seat.
Figure 5:
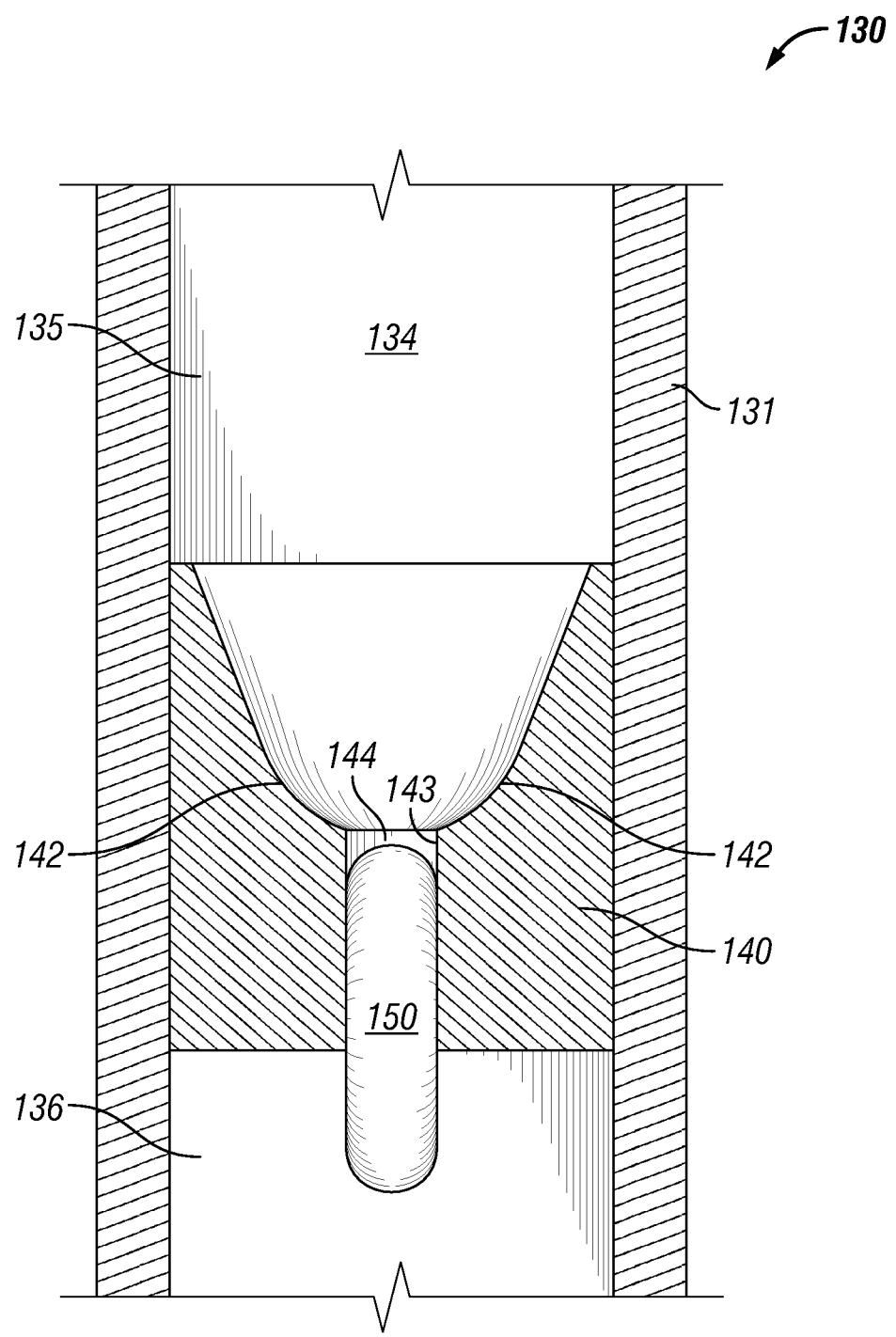
FIG. 5 is a partial cross-sectional view of the apparatus of FIG. 4 showing the seat in its first position with the plug element in its second position moving through the seat.

Referring now to FIGS. 4-5, in another embodiment, an apparatus for restricting fluid flow is shown as ball seat 130 comprising tubular member 131 and seat member 140. Tubular member 131 comprises outer wall surface 132 and inner wall surface 133 defining bore 134. Bore 134 is divided into upper bore 135 and lower bore 136 by seat member 140. Seat member 140 can be secured to inner wall surface 133 through any method or device know in the art such as those discussed above with respect to the embodiments of FIGS. 1-3.

Seat member 140 comprises seat 142 and inner wall surface 143 defining bore seat member bore 144. In the embodiment of FIGS. 4-5, seat 142 is curved so as to be reciprocal in shape to a plug member shown as a spherical ball 150. Seat 142 provides a sealing surface for engagement with ball 150.

In the embodiment of FIGS. 4-5, ball 150 is formed out of one or more shape-memory materials such as those identified above with respect to the embodiment of FIGS. 1-3.

In operation of the embodiment of FIGS. 4-5, ball seat 130 is secured to a work or tubing string (not shown) and lowered into the wellbore (not shown). A downhole tool (not shown) is disposed in the work string above ball seat 130. Upon reaching the desired location within the wellbore, plug element, shown in this embodiment as ball 150, is transported down the tubing string until it lands on seat 142 of seat member 140. Thereafter, fluid, such as hydraulic fluid, is pumped down the tubing string causing downward force or pressure to act on ball 150 to force ball 150 into seat 142. The fluid pressure above ball 150 is increased until it reaches the actuation pressure of the downhole tool causing the downhole tool to perform its intended function, e.g., open a valve, set a packer, set a bridge plug, and the like.

After the downhole tool has performed its intended function, additional fluid pressure or other stimulus, such as heat, acidity, electromagnetic pulse(s), light, etc., can be exerted on ball 150 to force ball 150 further into and ultimately, through seat member 140 as illustrated in FIG. 5. During passage of ball 150 through seat member 140, ball 150 is deformed such that ball 150 can pass through seat member bore 144 as illustrated in FIG. 5. After passage of ball 150 through seat member 140, ball 150 can return to its original shape due to the shape-memory material so that it can be transported further through the tubing string to land on another seat member for actuation of another downhole tool or for performance of any other suitable downhole operation, e.g., acid stimulation.

Alternatively, the activation of the shape-memory material can transform the shape of ball 150 to the shape shown in FIG. 5. In other words, the shape of ball 150 as manufactured using the shape-memory material is the shape shown in FIG. 5 and the shape toward which ball 150 is biased. Thus, after passing through seat member 140, ball 150 is maintained in the shape shown in FIG. 5.

Figure 6:
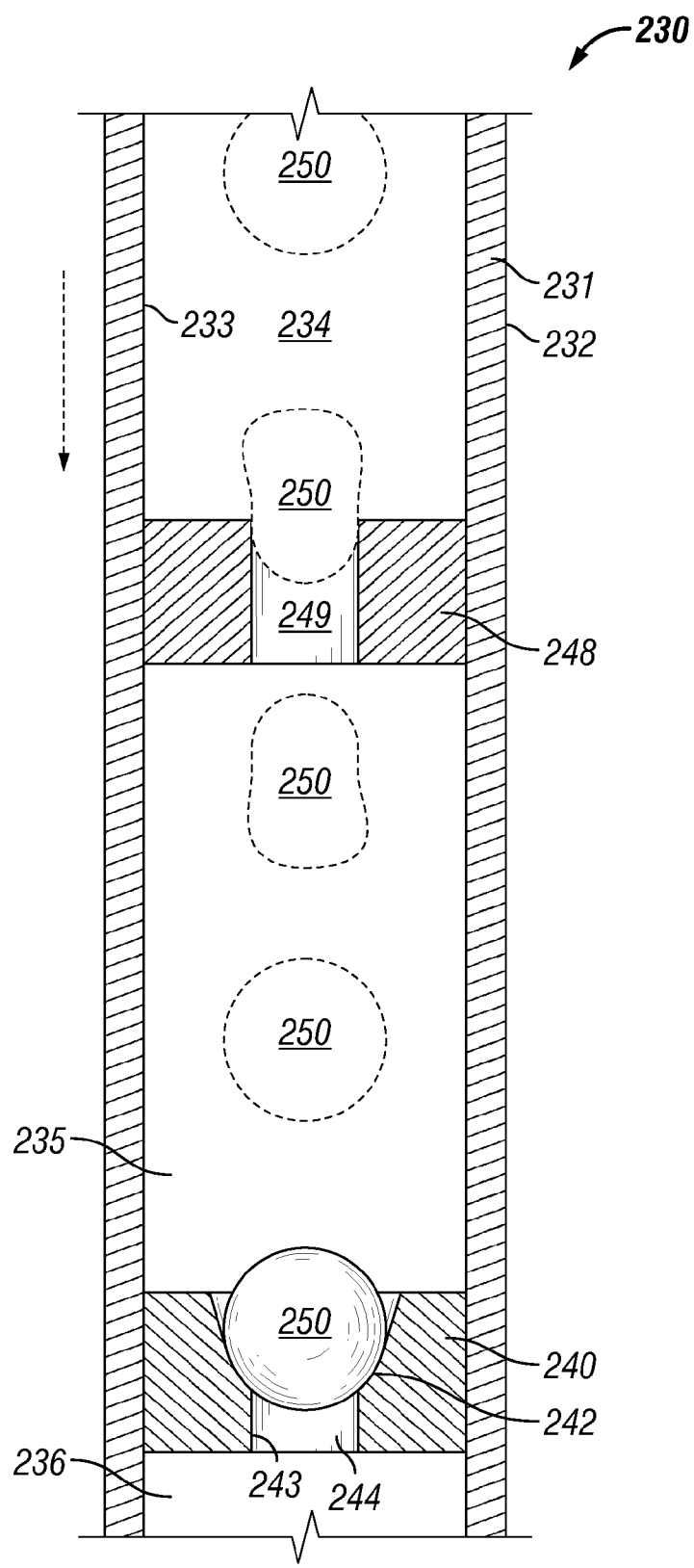
FIG. 6 is a partial cross-sectional view of a tubular member having a restriction and a seat disposed therein, with a plug element being shown in multiple locations as moving down through the restriction, changing shape, and landing on the seat.

Referring now to FIG. 6, in another embodiment, an apparatus for restricting fluid flow is shown as ball seat 230 comprising tubular member 231 and seat member 240. Tubular member 231 comprises outer wall surface 232 and inner wall surface 233 defining bore 234. Bore 234 is divided into upper bore 235 and lower bore 236 by seat member 240. Seat member 240 can be secured to inner wall surface 233 through any method or device know in the art such as those discussed above with respect to the embodiments of FIGS. 1-5.

Seat member 240 comprises seat 242 and inner wall surface 243 defining bore seat member bore 244. In the embodiment of FIG. 6, seat 242 is curved so as to be reciprocal in shape to a plug member shown as a spherical ball 250. Seat 242 provides a sealing surface for engagement with ball 250. In FIG. 6, ball 250 is shown in multiple locations as being transported through tubular member 231 from the top of FIG. 6 toward the bottom of FIG. 6. In other words, it is to be understood that FIG. 6 shows a single ball 250 in multiple positions as it is transported in the direction of the arrow.

Disposed with bore 234 above seat member 240 is restriction 248. Restriction 248 can be any structural component or device that can be found within a tubing string. For example, restriction 248 can be another seat, a bridge plug, a packer, or other downhole tool that has a narrow passageway through which fluid flow is permitted from above to below restriction 248.

Ball 250 is formed of a shape-memory material such as those identified above. Initially, ball 250 is transported through bore 234 in its non-operational shape which comprises a plurality of shapes. In other words, ball 250 has an amorphous shape. Due to its amorphous shape, ball 250 is able to pass through restriction 248.

As illustrated in FIG. 6, ball 250 is initially transported through tubular member 231 in the direction of the arrow while in its operational shape, i.e., a spherical ball shape that is reciprocal to the shape of seat 242. Upon reaching restriction 248, however, the movement of ball 250 is restricted. Because ball 250 has an amorphous shape, pressure acting in the direction of the arrow forces ball 250 into passageway 249 disposed through restriction 248. Upon passing through passageway 249, ball 250 returns to its operational shape due the shape memory material forming ball 250. However, ball 250 remains malleable or pliable.

After passing restriction 248, ball 250 is contacted with a stimulus, such as an increase in temperature or an increase or decrease in the acidity of the fluid within upper bore 235. The stimulus causes ball 250 to retain its operational shape so that it can land on seat 242 as shown at the bottom of FIG. 6. The stimulus is maintained during downhole operations that require ball 250 to remain on seat 242. Thereafter, the stimulus can be removed and an increase in pressure will force ball 250 through seat member bore 244 in a manner similar to the manner discussed above with respect to the embodiment of FIGS. 4-5. Upon being pushed through seat member bore 244, seat member 240 is ready to receive another plug element so that an additional downhole operation can be performed.

In certain other embodiments, the seat member and/or plug element can be formed of a shape-memory material that can be manipulated by outside stimuli such as temperature or acidity. In such embodiments, an operator of the tubing string can manipulate the shape of the seat member and/or plug element depending on the temperature, acidity, or other outside stimuli acting on the seat member and/or plug element. Thus, the size of the opening through a seat member can be customized and/or the plug element can be allowed to pass through one or more restrictions within the tubing string until the operator desires the plug element to achieve its operational shape and land on a seat member.

It is to be understood that the invention is not limited to the exact details of construction, operation, exact materials, or embodiments shown and described, as modifications and equivalents will be apparent to one skilled in the art. For example, although the apparatuses described in greater detail with respect to FIGS. 1-6 are ball seats having a ball as their respective plug elements, it is to be understood that the apparatuses disclosed herein may be any type of seat known to persons of ordinary skill in the art that include a radially expandable seat member. For example, the apparatus may be a drop plug seat, wherein the drop plug temporarily restricts the flow of fluid through the wellbore. Therefore, the terms "plug" and "plug element" as used herein encompasses a ball as shown and discussed with respect to the embodiments of the Figures, as well as any other type of device that is used to restrict the flow of fluid through a seat. Further, in all of the embodiments discussed with respect to FIGS. 1-6, upward, toward the surface of the well (not shown), is toward the top of FIGS. 1-6, and downward or downhole (the direction going away from the surface of the well) is toward the bottom of FIGS. 1-6. However, it is to be understood that the seats may have their positions rotated. In addition, the ball seats can be used in any number of orientations easily determinable and adaptable to persons of ordinary skill in the art. Accordingly, the invention is therefore to be limited only by the scope of the appended claims.

What is claimed is:

1. An apparatus for restricting flow through a conduit, the apparatus comprising:
a housing having a longitudinal bore and a seat member disposed within the bore, the seat member comprising a shape-memory material that is moveable between a first shape for receiving a plug element to restrict fluid flow through the longitudinal bore and a second shape for passage of the plug element through the seat member in response to at least one stimulus selected from the group consisting of temperature, electromagnetic field, acidity, chemical solution and light.

2. The apparatus of claim 1, wherein the seat member is biased toward the second shape by the shape-memory material.

3. The apparatus of claim 1, wherein the seat member is biased toward the first shape by the shape-memory material.

4. An apparatus for restricting flow through a conduit, the apparatus comprising:
a housing having a longitudinal bore and a seat disposed within the bore for receiving a plug element to restrict fluid flow through the longitudinal bore, the plug element comprising a shape-memory material that is moveable between a first shape for landing on the seat to restrict fluid flow through the longitudinal bore and a second shape for passage of the plug element through the seat member in response to at least one stimulus selected from the group consisting of temperature, electromagnetic field, acidity, chemical solution and light; and
wherein the plug element is biased toward the second shape by the shape-memory material.

5. A method of restricting fluid flow through a tubular member, the method comprising the steps of:
(a) transporting a plug element through a longitudinal bore of a tubular member;
(b) landing the plug element on a seat disposed within the tubular member causing restriction of fluid flow through the seat, the seat comprising a shape-memory material that is moveable between a non-operational shape and an operational shape in response to at least one stimulus selected from the group consisting of temperature, electromagnetic field, acidity, chemical solution and light, the operational shape allowing the plug element to land on the seat to restrict fluid flow through the tubular member;
(c) moving the seat from the operational shape toward the non-operational shape and transporting the plug element through the seat;
(d) returning the seat to the operational shape by activation of the shape-memory material of the seat; and
(e) repeating steps (a) and (b).

6. The method of claim 5, wherein prior to step (b), the seat is contacted with the stimulus to retain the seat in the operational shape.

7. The method of claim 5, wherein during step (d), the stimulus is contacted with the seat.

8. A method of restricting fluid flow through a tubular member, the method comprising the steps of:
(a) transporting a plug element through a longitudinal bore of a tubular member, the plug element comprising a shape memory material and moveable between a non-operational shape and an operational shape in response to at least one stimulus selected from the group consisting of temperature, electromagnetic field, acidity, chemical solution and light, the operational shape allowing the plug element to land on a seat disposed within the tubular member to restrict fluid flow through the tubular member;
(b) landing the plug element on the seat causing restriction of fluid flow through the seat;
(c) moving the plug element from the operational shape to the non-operational shape and transporting the plug element through the seat; and
(d) returning the plug element to the operational shape by activation of the shape-memory material of the plug element.

9. The method of claim 8, wherein the stimulus is contacted with the plug element during step (d).

10. The method of claim 8, wherein during step (c), the plug element is contacted with the stimulus to move the plug element from the operational shape to the non-operational shape.

* * * * *